United States Patent
Bhargava

(10) Patent No.: US 7,980,509 B2
(45) Date of Patent: Jul. 19, 2011

(54) AIRCRAFT TAXIING SYSTEMS

(75) Inventor: Brij B. Bhargava, Santa Barbara, CA (US)

(73) Assignee: The Ashman Group, LLC, Santa Barbara, CA (US)

(*) Notice: Subject to any disclaimer, the term of this patent is extended or adjusted under 35 U.S.C. 154(b) by 73 days.

(21) Appl. No.: 12/399,854

(22) Filed: Mar. 6, 2009

(65) Prior Publication Data
US 2009/0173821 A1 Jul. 9, 2009

Related U.S. Application Data

(63) Continuation-in-part of application No. 12/137,789, filed on Jun. 12, 2008, now abandoned, which is a continuation-in-part of application No. 11/683,711, filed on Mar. 8, 2007, now abandoned.

(51) Int. Cl.
*B64C 15/00* (2006.01)
*B64D 41/00* (2006.01)
*B64D 27/02* (2006.01)

(52) U.S. Cl. .............................. 244/50; 244/55; 244/58

(58) Field of Classification Search .................. 701/15; 244/50, 58, 55, 1 N, 12.5
See application file for complete search history.

(56) References Cited

U.S. PATENT DOCUMENTS 3,034,748 A 5/1962 Koup
(Continued)

FOREIGN PATENT DOCUMENTS
EP 1785614 A2 5/2007
(Continued)

OTHER PUBLICATIONS

"Trident with a fourth prong", Dec. 18, 1969, Flight International No. 3171, vol. 96, pp. 952-957.*
(Continued)

*Primary Examiner* — Tien Dinh
*Assistant Examiner* — Richard R Green
(74) *Attorney, Agent, or Firm* — Koppel, Patrick, Heybl & Philpott; Michael J. Ram

(57) ABSTRACT

Thrust systems for passenger aircraft provide at least one flight engine and a taxi engine wherein all flight engines together provide, in total, a takeoff thrust arranged in a takeoff thrust direction and the taxi engine provides a taxi thrust which does not exceed 15% of the takeoff thrust and is directed substantially the same as the takeoff thrust direction. The taxi thrust is thereby sufficient to taxi the aircraft along a taxi path. In a system embodiment, the taxi thrust does not exceed 7.5% of the flight thrust. In another system embodiment, the flight engines have, in total, a flight engine weight and the taxi engine has a taxi engine weight that does not exceed 10% of the flight engine weight. In a system embodiment, the taxi engine weight does not exceed 7.0% of the flight engine weight. In another system embodiment, the taxi engine has a rated thrust and is configured so that the taxi thrust is within 40% and 100% of the rated thrust. In another system embodiment, the taxi engine includes a rotatable engine portion to divert the taxi thrust over an azimuth angle to assist taxiing along the taxi path. The taxi engine significantly reduces fuel costs because when flight engines are used for taxiing, they operate in a very inefficient region of their rated thrust and consume excessive fuel. The taxi engine also significantly reduces the brake repair and adjustment that is incurred when the flight engines are used for taxiing and the brakes are frequently engaged to counter their high thrust.

23 Claims, 6 Drawing Sheets

U.S. PATENT DOCUMENTS

| | | | |
|---|---|---|---|
| 3,568,958 | A | 3/1971 | Bhore |
| 3,762,670 | A | 10/1973 | Chillson |
| 3,807,664 | A | 4/1974 | Kelly et al. |
| 4,091,613 | A | 5/1978 | Young |
| 4,541,237 | A * | 9/1985 | Dickey ........................ 60/39.281 |
| 4,659,039 | A | 4/1987 | Valdes |
| 5,271,295 | A | 12/1993 | Marnot |
| 5,480,107 | A | 1/1996 | Bacon |
| 5,529,263 | A | 6/1996 | Rudolph |
| 5,687,907 | A * | 11/1997 | Holden ............................ 60/230 |
| 5,813,630 | A | 9/1998 | Williams |
| 5,855,340 | A | 1/1999 | Bacon |
| 6,247,668 | B1 | 6/2001 | Reysa et al. |
| 7,225,607 | B2 * | 6/2007 | Trumper et al. ............. 60/226.1 |
| 7,226,018 | B2 | 6/2007 | Sullivan |
| 7,237,748 | B2 | 7/2007 | Sullivan |
| 2005/0178890 | A1 | 8/2005 | Bacon |
| 2005/0224642 | A1 | 10/2005 | Sullivan |
| 2008/0099599 | A1 | 5/2008 | Hutterer |

FOREIGN PATENT DOCUMENTS

| | | |
|---|---|---|
| GB | 764684 | 1/1957 |
| GB | 2422643 | 4/2007 |
| WO | WO95/29094 | 11/1995 |
| WO | WO2006/138267 | 12/2006 |
| WO | WO2008/108933 A1 | 9/2008 |

OTHER PUBLICATIONS

Internal-combustion engine. (2008). In Encyclopaedia Britannica. Retrieved Jul. 17, 2008, from Encyclopaedia Britannica Online: http://www.britannica.com/EBchecked/topic/290504/internal-combustion-engine.

"Auxiliary Power Units", NASA Internet document from NASA webpage, dated Jan. 4, 2006 http://web.archive.org/web/20060104002432/http://spaceflight.nasa.gov/shuttle/reference/shutref/orbiter/apu/ accessed online through web archive on Oct. 2, 2008.

"Auxiliary Power Unit," Wikipedia article dated May 7, 2005 http://web.archive.org/web/20050507010530/http://en.wikipedia.org/wiki/Auxiliary_power_unit accessed online through web archive on Oct. 3, 2008.

International Search Report and Written Opinion of International Application No. PCT/US2009/003525 mailed Oct. 15, 2009.

* cited by examiner

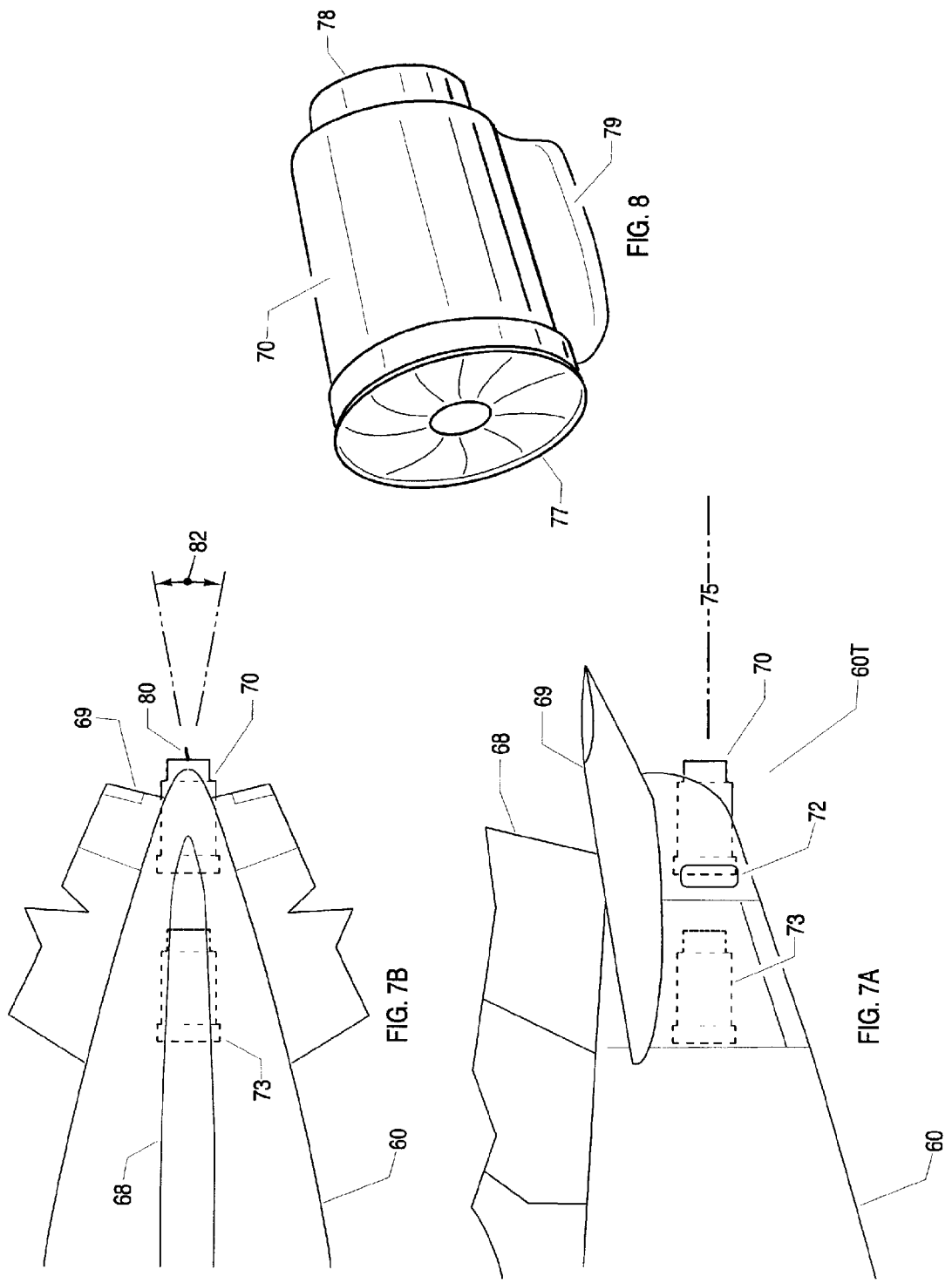

AIRCRAFT TAXIING SYSTEMS

CROSS REFERENCES TO RELATED APPLICATIONS

This application is a continuation-in-part of application Ser. No. 12/137,789 filed Jun. 12, 2008 now abandoned which is a Continuation-In-Part of application Ser. No. 11/683,711 filed Mar. 8, 2007 now abandoned.

BACKGROUND OF THE INVENTION

1. Field of the Invention The present disclosure relates generally to passenger aircraft and, more particularly, to aircraft taxiing.

2. Description of the Related Art

In modern passenger aircraft, weight, space, and costs are exceedingly important. It is known that up to 15% of the costs to operate a passenger aircraft are typically spent while the aircraft is on the ground. A significant portion of these costs are for taxiing between airport locations (e.g., gate, hangar, maintenance areas and runway) with power supplied by the aircraft's flight engines.

When flight engines are used for taxiing, they operate in a very inefficient region of their rated thrust and, accordingly, consume substantial pounds of fuel for each minute spent in this operational mode. The resultant fuel costs can be especially substantial at busy airports where aircraft frequently spend extended times between a gate and the runways with the flight engine(s) running. In addition, significant brake maintenance costs are incurred. When the flight engines are used for taxiing, the brakes must be frequently engaged to counter the high thrust of these engines. This significantly increases the frequency of brake repair and adjustment.

Many passenger aircraft also include power systems that provide a number of ground services (e.g., cooling, heating, lighting, hydraulics, engine start, ground system checkout, and emergency power). These additional systems are often referred to as auxiliary power units and emergency power units. Because they add weight to the aircraft while it is in flight, they are another source of added costs.

Any reduction in parts, weight and complexity in aircraft systems is highly desirable. System reliability and maintainability are also important issues, since they impact the availability of an aircraft and its overall costs.

BRIEF SUMMARY OF THE INVENTION

The present disclosure is generally directed to aircraft taxiing systems. The drawings and the following description provide an enabling disclosure and the appended claims particularly point out and distinctly claim disclosed subject matter and equivalents thereof.

BRIEF DESCRIPTION OF THE DRAWINGS

FIG. 7A is an enlarged view of structure within the curved line 7A of FIG. 6;

FIG. 7B is a top view of the view of FIG. 7A;

FIG. 8 is a perspective view of a taxi engine embodiment in FIGS. 7A and 7B;

DETAILED DESCRIPTION OF THE INVENTION

Aircraft taxiing systems of the present disclosure provide substantial advantages to an aircraft owner in the form of, for example, reduced fuel consumption, lowered emissions, lower noise levels, lower maintenance, and less wear (and thus longer useful life) of the flight engine(s). There is also less wear and longer useful life of the aircraft brakes since they do not have to oppose the high thrust of the flight engines.

These taxiing systems are small in size and weight, highly reliable, and low cost. They require minimum changes to existing aircraft systems, are usable for power generation on the ground and during flight (rather than being just additional dead weight) and can be readily integrated with existing aircraft systems. In addition, they make existing on board auxiliary power systems unnecessary or redundant.

These taxiing systems are generally realized with small gas turbine engines that are configured to operate at a thrust level which is highly efficient because this level has a preferred relationship to their standard rated thrust. This is in marked contrast to aircraft that presently use their flight engines for taxiing purposes. The flight engines are then operating in a region far below 33% of their rated thrust so that they are operating in a highly inefficient manner. Even at or near their idle speed, the flight engines generate far more thrust than that required for taxiing. In contrast, the taxi engines of the disclosed taxiing systems are specifically designed to operate at an efficient ratio of their rated thrust to thereby reduce fuel consumption and operating costs.

In an extreme emergency condition (e.g., when the aircraft's flight engines fail or are running out of fuel), these taxiing systems can provide a glide thrust sufficient to facilitate the aircraft's safe descent along a glide path. Additionally, they can provide redundancy and/or additional power to aircraft when necessary to enhance aircraft reliability. They can be integrated with the systems of new aircraft and, when retrofitted into existing aircraft, they can replace the non-flight engines (e.g., auxiliary power units) so that the aircraft's weight is substantially unchanged. In the latter case, these systems reduce the low utilization factor problems of existing auxiliary power and emergency power units used in commercial aviation.

Figure 1A:
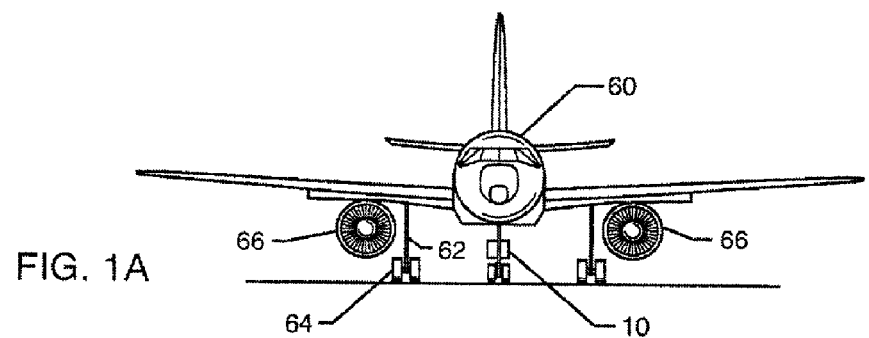
FIGS. 1A, 1B and 1C are front, bottom, and side views of an exemplary passenger aircraft.
Figure 1B:
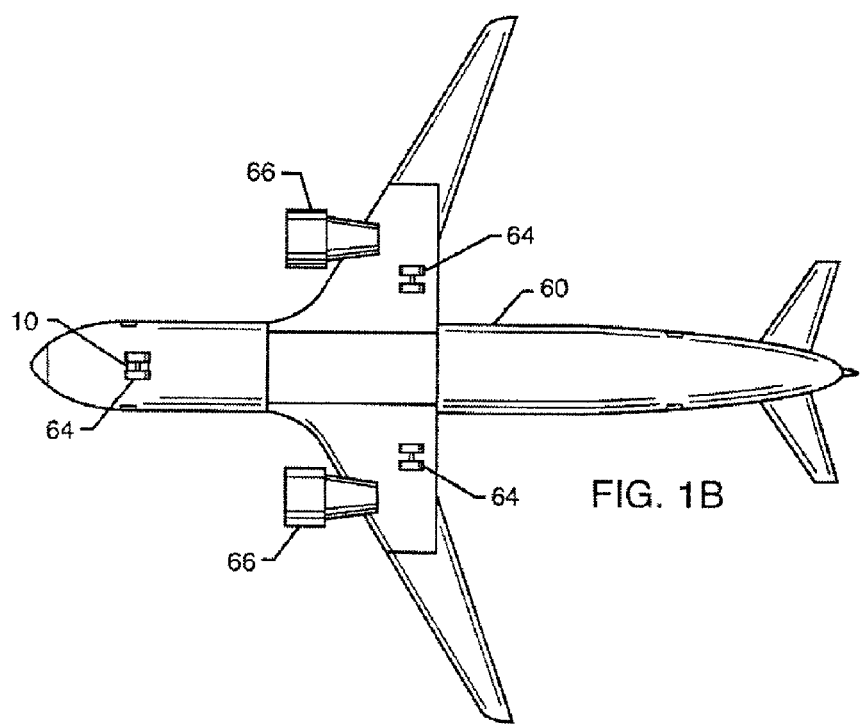
Figure 1C:
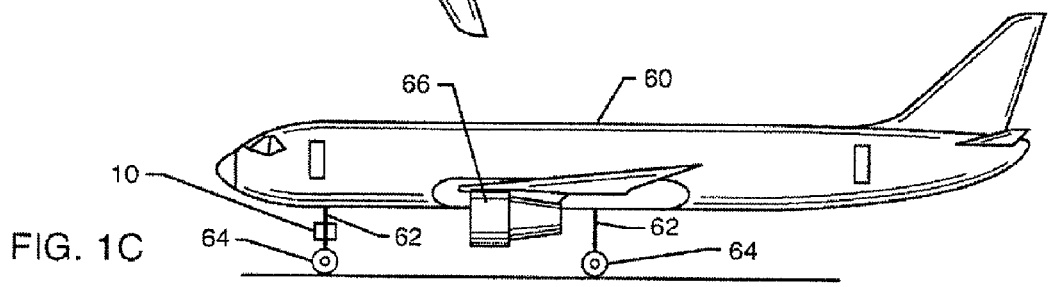

In particular, a taxi system embodiment 10 may be located on an aircraft 60 in various locations as illustrated in FIGS. 1A-1C. A preferred location is on one of the landing gear 62, on which are included wheels 64. The system 10A provides taxiing of the aircraft 60 without having to operate the aircraft flight engine(s) 66.

Figure 2:
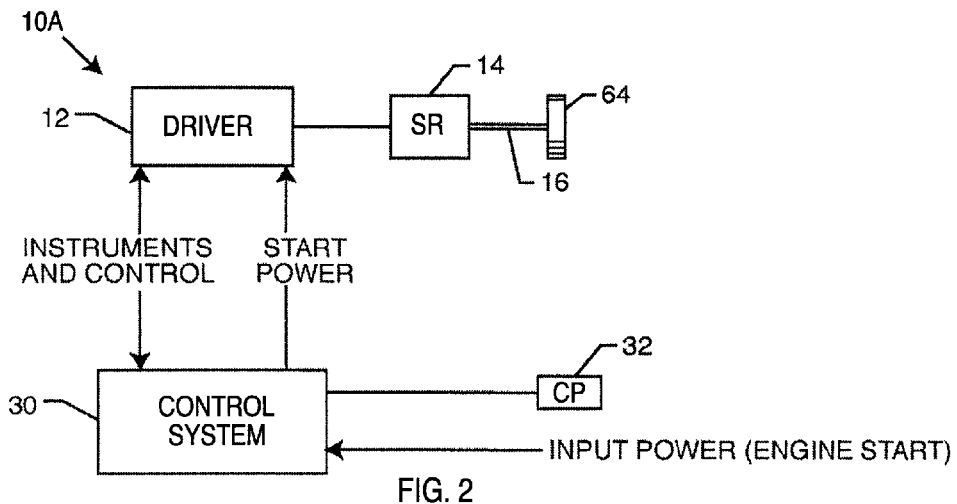
FIGS. 2 and 3 are block diagrams of taxiing system embodiments that may be coupled to a landing wheel of the aircraft of FIGS. 1A, 1B and 1C.

FIG. 2 schematically illustrates an embodiment 10A of the taxi system of FIGS. 1A-1C. The system 10A includes a driver 12 which may be, for example, an internal combustion engine or a turbine engine that is connected to a speed reducer (SR) 14. An exemplary speed reducer is a gearbox. An output shaft 16 of the speed reducer 14 is mechanically linked to power the wheels 64 of one of the aircraft landing gear to, thereby, provide taxi power for moving the wheels and taxiing the aircraft (60 in FIG. 1C) without having to start the flight engine(s) (66 in FIG. 1C).

The driver 12 is in electronic communication with a control system 30, which also includes a control panel 32 that has typical control structures (e.g., instrumentation, displays, controls, indicator lights, batteries, switches and associated software). Such control systems are well-known in the aircraft art as are, also, the design of turbine engines, auxiliary power units (APU's), emergency power units (EPU's), and environmental control systems (ECS's). Gearboxes and engine mounting structures are also well-known and quite common to those having skill in the art and, accordingly, the details of such systems, equipment and structures need not be discussed here.

In a preferred embodiment of the disclosure, control system 30 provides starting power to driver 12 as well as primary output power and emergency output power to the aircraft. The embodiment 10A may be retrofitted to existing aircraft to provide sufficient shaft horsepower to wheels 64 to provide taxiing capability. This embodiment of a power system provides taxiing capability while being small in size and weight, highly efficient, highly reliable, low cost, low in fuel consumption, lower in emissions to the environment and low in maintenance.

Such a system, retrofitted to an existing aircraft, would require minimal changes to existing aircraft systems. Such a system could also be provided as standard equipment on new aircraft. Driver 12 in the preferred embodiment of taxi system 10 may be a small piston engine of approximately 150 hp to 400 hp depending on the size and weight of the aircraft and would likely add less than 400 pounds in weight. Such qualified engines for aerospace applications are generally highly reliable and would need very minor modifications to meet the requirements of the auxiliary power system of the present disclosure. Alternatively, driver 12 may also be a small turbine engine that produces sufficient power to drive the wheels 64 to provide taxiing capability. Such an engine is highly reliable and, in combination with a speed reducer, would add only about 160 pounds to the aircraft weight.

Figure 3:
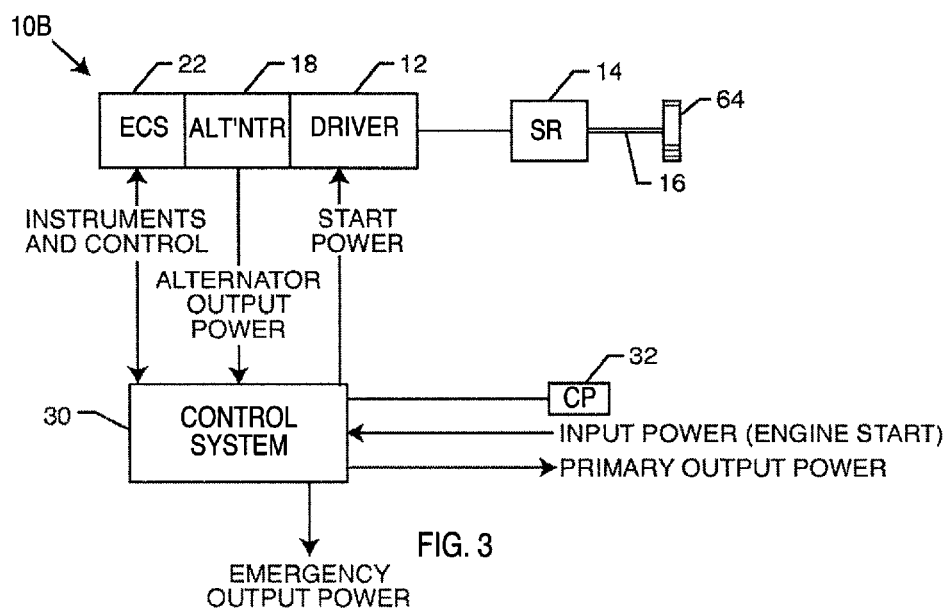

FIG. 3 illustrates schematically a second embodiment 10B. Such a taxi system could be located at a similar location or locations on aircraft 60 as would the taxi system of FIG. 2. In this embodiment, power system 10B includes driver 12, which would be designed to have a high speed power shaft (not shown) and a low speed geared power shaft (not shown). A high-speed alternator (ALT'NTR) 18 would be mounted on the high speed power shaft. Alternator 18, as is well known in the art, may also act as a starter/generator. A speed reducer 14 is also mounted on driver 12 at the low speed shaft and its output is mechanically linked to power the wheels 64 of aircraft 60. Alternator 18 may be used in conjunction with an ECS 22, which provides conditioned air where required in various compartments of the aircraft.

Driver 12 is in electronic communication with control system 30, which also includes control panel (CP) 32 that includes typical control structures (e.g., instrumentation, displays, controls, indicator lights, batteries, switches and associated software). As has been previously discussed, such control systems are well known and quite common to those having skill in the art and the details of such a control system need not be discussed here. In this embodiment of the disclosure, control system 30 provides starting power to driver 12, and subsequently, primary output power and emergency output power to aircraft 60.

This alternative embodiment 10B may be retrofitted to existing aircraft to provide sufficient shaft horsepower to the wheels 64 to provide taxiing capability. Accordingly, the aircraft's flight engines need not be started. This embodiment of a power system provides taxiing capability while being small in size and weight, highly efficient, highly reliable, low in cost, low in fuel consumption, lower in emissions to the environment and low in maintenance. Such a system, retrofitted to an existing aircraft, would require minimal changes to existing aircraft systems. Such a system could also be provided as standard equipment on a new aircraft.

Driver 12 in this embodiment of the disclosure may be a piston engine or a modified turbine engine with the alternator 18 being a high speed alternator, with a desired output, for example, of 30 to 120 kVA. The combination of driver 12, alternator 18, speed reducer 14 (which may be a gear box) for low speed and the associated controls, would likely add less than 600 pounds of weight to the aircraft. Several types of engines currently exist from which a suitable one may be chosen and modified as a driver to provide a light weight, reliable, low maintenance, low fuel consumption, low noise, low cost, and low emissions system. Such a power system 10 could eventually replace or render unnecessary conventional auxiliary power units, thereby further reducing the total weight and number of parts of the conventional systems in an aircraft. Additionally, such a system could be integrated to supplement and/or provide additional electrical power or designed to provide added redundancy if necessary.

Figure 4:
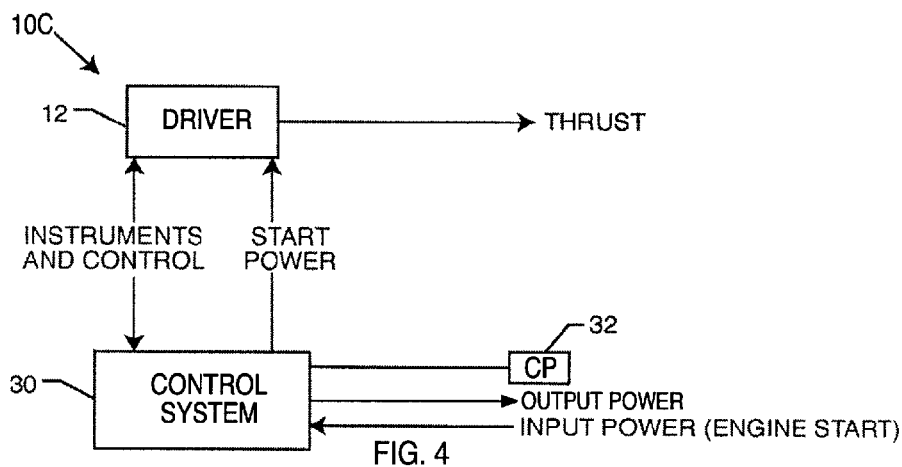
FIG. 4 is a block diagram of another taxiing system embodiment for the aircraft of FIGS. 1A, 1B and 1C.

FIG. 4 schematically illustrates a third embodiment 10C to provide taxiing of aircraft 60, without having to use the aircraft's flight engines (66 in FIGS. 1A-1C). In this embodiment, driver 12 may be mounted to aircraft 60 in any of several convenient locations. Such a power system 10C could be readily retrofitted to existing aircraft and would generate sufficient thrust that would enable the driver to provide taxiing of the aircraft 60 without having to start the flight engines 66 of the aircraft.

Driver 12 may be a small turbine engine that provides sufficient taxi thrust wherein the taxi thrust will depend on the requirements of each particular aircraft. Such a taxi engine in most applications would add minimal weight and may be the lowest cost power system to provide taxiing capability, for existing or new aircraft. Driver 12 is in electronic communication with control system 30 which has typical control structures (e.g., instrumentation, displays, controls, indicator lights, batteries, switches and associated software). In this embodiment 10C, control system 30 also provides starting power to driver 12. Embodiments of the driver 12 are discussed below in greater detail with reference to taxi engines (e.g., as illustrated in FIGS. 7A, 7B, 8, 9A, 9B and 10).

Figure 5:
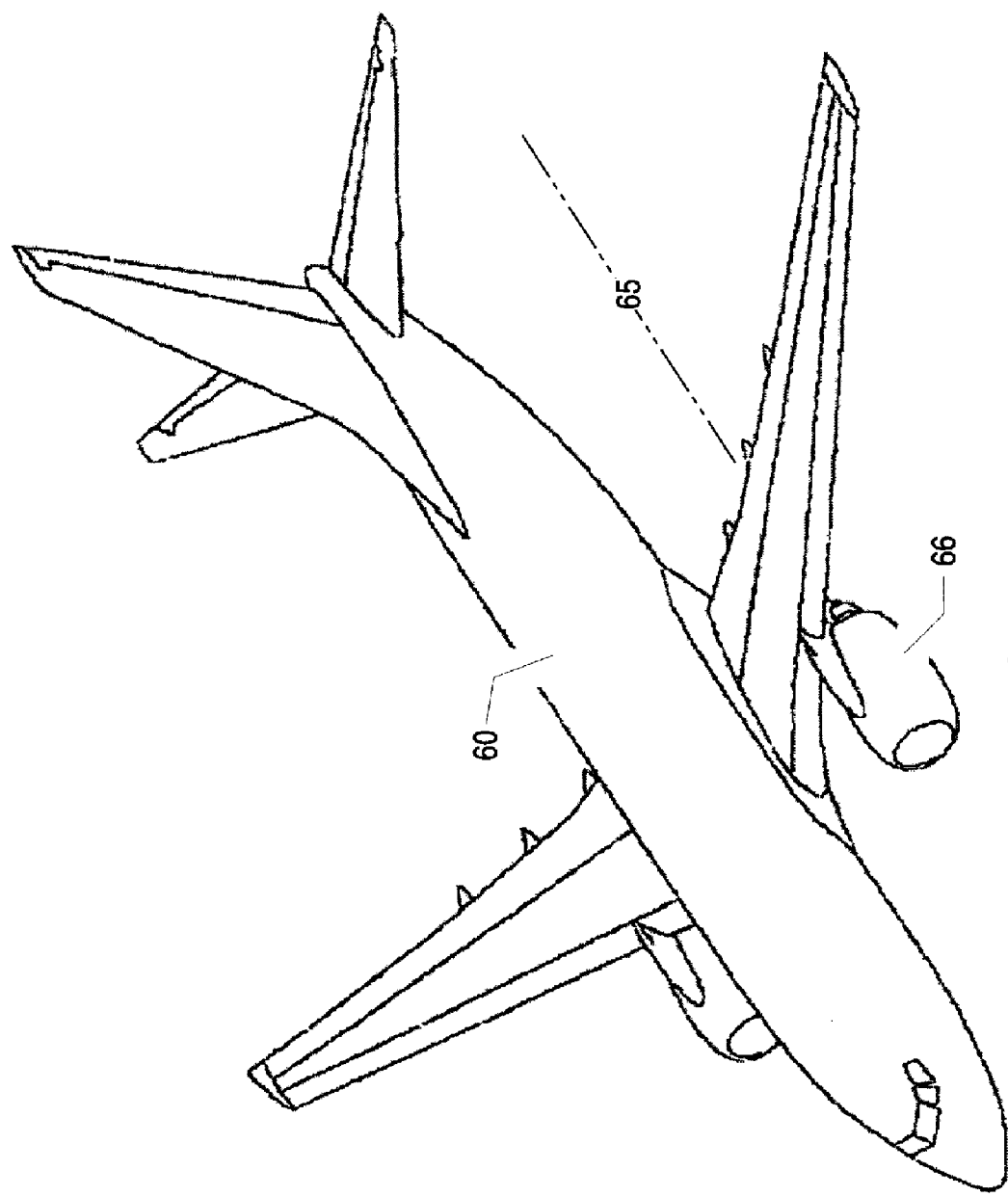
FIG. 5 is a perspective view of an aircraft similar to that of FIGS. 1A, 1B and 1C when the aircraft is in flight.
Figure 6:
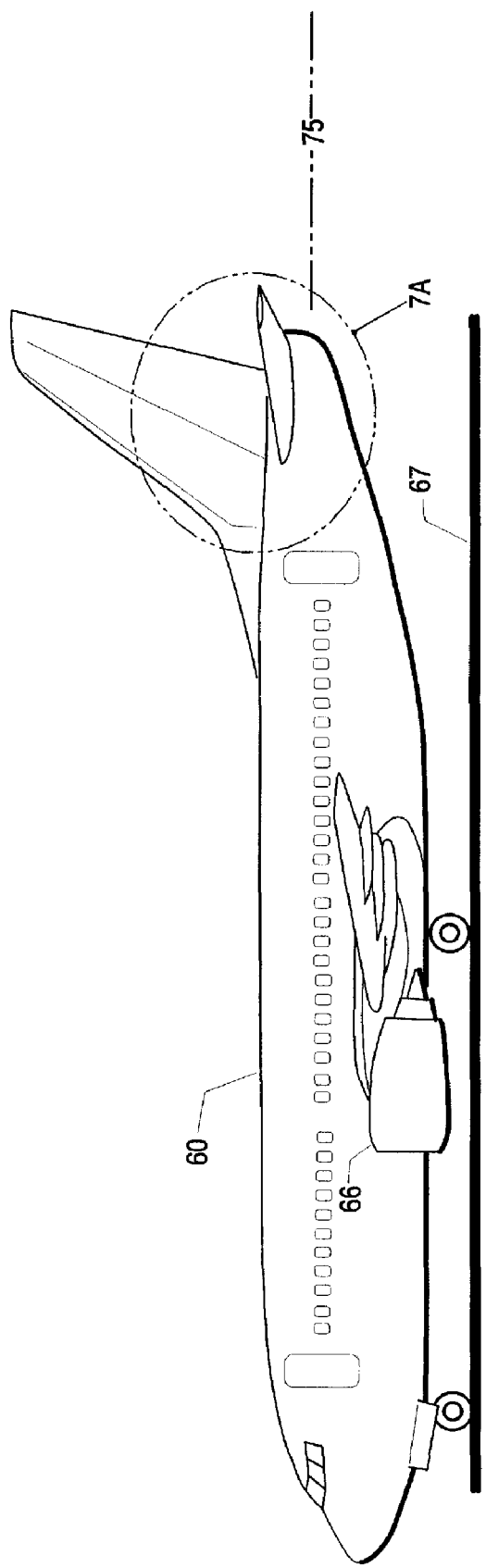
FIG. 6 is side view of the aircraft of FIG. 5 which shows it in position to taxi along a taxi surface.

FIG. 5 is an illustration of a passenger aircraft 60 similar to the aircraft of FIGS. 1A-1C. The aircraft 60 is shown in a flight mode in which each of the flight engines 66 is providing a flight thrust 65 in a flight thrust direction wherein the flight thrust and direction are sufficient for continued flight. FIG. 6 illustrates the aircraft 60 of FIG. 5 in position to taxi along a taxi path 67 which might be, for example, be a gate surface, a hangar surface, a maintenance area surface, a runway surface, or a service surface leading to the runway surface. It is noted that these airport surfaces are sometimes generically referred to as the tarmac. To facilitate taxiing, the aircraft includes a taxi engine located in an area of the aircraft such as that enclosed by a broken line 7A.

As mentioned above, taxi engine embodiments of the driver 12 of FIG. 4 are described in FIGS. 7A, 7B, 8, 9A, 9B and 10. In particular, FIG. 7A is an enlarged view of the area 7A of FIG. 6 and FIG. 7B is a top view of the structure of FIG. 7A. These figures show the tail structure 60T of the airplane 60 which includes a vertical stabilizer 68 and horizontal stabilizers 69. They also illustrate the driver of FIG. 10C in the form of a taxi engine 70 that is installed in the tail structure 60T of the aircraft 60. The taxi engine is arranged to generate a taxi thrust 75 which is sufficient to initiate and maintain taxiing of the aircraft along a taxi surface (67 in FIG. 6 which also shows the taxi thrust 75).

The taxi engine 70 is preferably a gas turbine engine which draws air into an intake portion and generates an exhaust from an exhaust portion to thereby provide the taxi thrust 75. Preferably, the tail structure 60T is modified to define an intake opening 72 which enhances air flow into the intake of the taxi engine 70. Although the taxi engine 70 is shown in a location in which it partially extends past the aircraft's contour, the engine may be located in other locations. For example, it can be located further forward as in the location 73.

As shown in FIG. 7B, the taxi engine 70 may include a thrust steering mechanism 80 (e.g., a rotatable vane positioned in the engine's exhaust) which can cause the taxi thrust 75 of FIG. 7A to be rotated in azimuth over a rotation angle 82 (e.g., a rotation angle on the order of 10%). Although passenger aircraft generally have other guidance means (e.g., a steerable nose wheel) to direct them along a taxi path, this taxi engine embodiment may be useful in enhancing this guidance (particularly, when large aircraft are taxiing in difficult conditions such as windy conditions).

A taxi engine embodiment 70 is illustrated in FIG. 8. The engine is preferably a gas turbine engine having an intake structure 77 and an exhaust structure 78. The engine also preferably includes auxiliary structure 79 (e.g., comprising starter, generator, fuel pump, oil pump, gear box, control electronics and associated software) that can provide the functions (e.g., cooling, heating, lighting, hydraulics, engine start, ground system checkout, and emergency power) of conventional aircraft auxiliary structures (e.g., APU's, EPU's, and ECS's).

Figures 9A, 9B, 10:
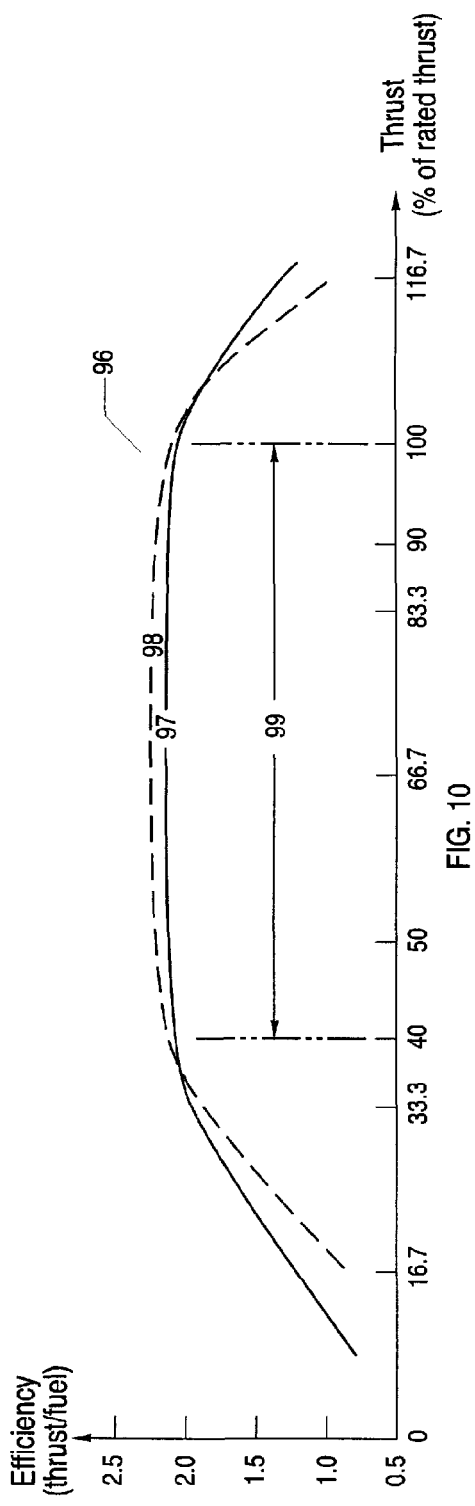
FIGS. 9A and 9B are graphs which include exemplary parameters for flight and taxi engines.
FIG. 10 is a graph that illustrates engine efficiency as a function of rated thrust.

The table 90 of FIG. 9A shows that an exemplary passenger aircraft such as a Boeing 737-300 has a takeoff weight between 125,000 and 140,000 pounds and includes two flight engines which each weigh on the order of 4300 pounds. Each of these flight engines can generate a takeoff thrust between 20,000 and 22,000 pounds (around standard sea level conditions). Once the aircraft is in level cruise conditions, each engine typically generates a cruise thrust between 4,600 and 5,100 pounds.

It has been found (e.g., through taxiing tests with an exemplary passenger aircraft) that an initial thrust level is required to initiate taxiing of the aircraft and that a lesser thrust is required to maintain taxiing. As a result of these taxiing tests, it has been determined that a taxi engine for the Boeing 737-300 aircraft need only generate an initiation thrust on the order of 3000 pounds and may weigh as little as 600 pounds (this initiation thrust is the higher taxi thrust to initiate taxiing that was introduced above). The taxi thrust and taxi engine weight are shown in the table 90 of FIG. 9A and the results of the taxiing tests are summarized in the table 92 of FIG. 9B.

The table 92 shows, therefore, that the taxi engine weight need only be approximately 7.0% of the weight of the total weight of the flight engines and that the taxi engine thrust (thrust 75 in FIGS. 6 and 7A) need only be approximately 7.5% of the total flight engine takeoff thrust. That is, a weight percentage of 7.0% and/or a thrust percentage of 7.5% is sufficient to accomplish taxiing initiation and continuation for passenger aircraft. In order to provide a reasonable operational margin for operating parameters such as environmental conditions (e.g., elevation and temperature), airport conditions (e.g., runway surface variation and runway slope), and equipment variations (e.g., different aircraft models and manufacturers), the weight percentage and thrust percentage might be respectively increased to maximum values of 10% and 15%. These percentages are significantly different than those of current non-flight engines.

In addition to having a taxi thrust that is appropriately scaled to the total flight engine takeoff thrust, an airplane's taxi engine is preferably configured so that its taxi thrust has a preferred relationship to its standard rated thrust so that it also operates with high efficiency. The graph 96 of FIG. 10 plots efficiency versus thrust for typical gas turbine engines such as those in the Boeing 737-300. In particular, engine thrust is shown along the horizontal axis of FIG. 10 as a percentage of the engine's standard rated thrust wherein standard rated thrust of an engine is the maximum long-term recommended thrust—a gas turbine engine can exceed its rated thrust but should only do so for limited time periods. Efficiency is shown along the vertical axis wherein efficiency is defined herein as a ratio of pounds of thrust to pounds of fuel consumed each hour.

The plot 97 indicates that gas turbine flight engines exhibit high efficiency when their thrust is operating between 33% and 100% of their rated thrust. The plot 97 further indicates that the efficiency deteriorates rapidly as the operating thrust is reduced below 33% of the rated thrust and as the operating thrust is increased above 100% of the rated thrust. Large flight engines typically include a large number of low pressure (LP) and high pressure (HP) compressor and turbine stages which help to broaden the efficiency plot. In contrast, the smaller taxi engine 70 of FIGS. 7A, 7B and 8 generally has less stages and, accordingly, its efficiency plot 98 is narrower than the plot 98 and its lower and upper skirts fall off more rapidly.

The flight engines of a passenger aircraft such as the Boeing 737-300 are preferably configured so that they are generally operating in the region between 33% and 100% of their standard rated thrust and are most efficient when the aircraft's flight engines are operating at their cruise thrust. When these flight engines are used to generate the much lower taxi thrust along the tarmac, they are operating far below 33% of their rated thrust and are thus operating in a highly inefficient manner.

In contrast, the much smaller taxi engine 70 of FIGS. 7A, 7B and 8 is preferably configured with a rated thrust such that it is operating at maximum efficiency when it is generating its taxi thrust. For example, the rated thrust of the taxi engine is preferably chosen so that the taxi thrust of the taxi engine 70 falls in the preferred region 99 of FIG. 10 that is between 40% and 100% of the taxi engine's rated thrust. When the passenger load is low and/or the fuel load is low, the taxi thrust may need to be towards the low end of the region 99 and when the passenger load is high and/or the fuel load is high, the taxi thrust may need to be towards the high end of this region. When these criteria are met, both the flight and taxi engines will be operating at or near maximum efficiency and aircraft operating costs will be significantly reduced.

The embodiments of the disclosure described herein are exemplary and numerous modifications, variations and rearrangements can be readily envisioned to achieve substantially equivalent results, all of which are intended to be embraced within the spirit and scope of the appended claims.

I claim:

1. A thrust system for an aircraft having a tail portion, comprising:
   one or more flight engines positioned on said aircraft, each of said flight engines having a take-off thrust corresponding to a maximum rated thrust, a lesser cruise thrust and an idle thrust which is equal or less than the cruise thrust, all flight engines together providing a combined rated thrust sufficient for takeoff said flight engines arranged to direct said takeoff thrust in a takeoff thrust direction; and a taxi engine located in the fuselage in said tail portion, the taxi engine having a maximum rated thrust corresponding to a maximum taxi thrust, said maximum taxi thrust being less than said idle or cruise thrust and not exceeding 15% of the combined takeoff thrust provided by the flight engines and arranged to direct said taxi thrust in a taxi thrust direction that is substantially the same as said takeoff thrust direction;

said maximum taxi thrust being less than 33% of the rated thrust of one of the one or more flight engines;

said taxi thrust thereby sufficient to taxi said aircraft along a taxi path said taxi engine not required to provide thrust for the aircraft in takeoff or flight.

2. The system of claim 1, wherein said taxi thrust does not exceed 7.5% of said combined takeoff thrust.

3. The system of claim 1, wherein all of said flight engines have, in total, a flight engine weight and said taxi engine is configured with a taxi engine weight that does not exceed 10% of said flight engine weight.

4. The system of claim 3, wherein said taxi engine weight does not exceed 7.0% of said flight engine weight.

5. The system of claim 3, wherein said taxi engine is further configured to have a taxi thrust between 40% and 100% of said maximum taxi thrust so that said taxi engine efficiency approximates its maximum efficiency.

6. The system of claim 5, wherein:
said taxi thrust does not exceed 15% of said combined takeoff thrust; and said taxi engine weight does not exceed 10% of said flight engine weight.

7. The system of claim 1, wherein said taxi engine includes a rotatable engine portion to divert said taxi thrust over an azimuth angle to assist taxiing of said aircraft along said taxi path.

8. The system of claim 7, wherein said rotatable engine portion is a rotatable vane and said azimuth angle is at least ten degrees.

9. A method for taxiing an aircraft that carries one or more flight engines each having a maximum rated thrust, wherein all flight engines together provide a total rated thrust sufficient for takeoff in a takeoff thrust direction, the method comprising the steps of:
providing a taxi engine having a maximum rated thrust which is less than 15% of the total rated thrust of the one or more flight engines, said taxi engine being positioned in the aircraft tail; and
directing the thrust of the taxi engine in a taxi thrust direction that is substantially the same as said flight thrust direction to thereby taxi said aircraft along a taxi path, the thrust of the taxi engine not required to provide thrust in takeoff or flight;
wherein the maximum rated thrust of the taxi engine is less than 33% of the rated thrust of one of the one or more flight engines.

10. The method of claim 9, wherein said providing step includes the step of limiting said taxi thrust to 7.5% of said combined flight thrust.

11. The method of claim 9, wherein all of said flight engines have, in total, a flight engine weight and further including the step of limiting a taxi engine weight of said taxi engine to 10% of said flight engine weight.

12. The method of claim 11, wherein said limiting step includes the step of further limiting said taxi engine weight to 7.0% of said flight engine weight.

13. The method of claim 11, further including the step of configuring said taxi engine to have a taxi thrust between 40% and 100% of said taxi engine rated thrust.

14. The method of claim 13, wherein:
said providing step includes the step of limiting said taxi thrust to 15% of said total flight thrust; and
said limiting step includes the step of further limiting said taxi engine weight to 10% of said flight engine weight.

15. The method of claim 9 wherein the taxi engine provides ground movement of the aircraft without use of the flight engines.

16. A taxi system for an aircraft that includes at least one flight engine having a maximum rated thrust, wherein all flight engines together provide a total rated thrust sufficient for takeoff in a takeoff thrust direction, each of said at least one flight engines having a minimum thrust for efficient operation at 33% of said maximum rated thrust, said taxi system comprising:
a taxi engine in said aircraft having a maximum rated thrust corresponding to a maximum taxi thrust which does not exceed 15% of the total flight engine rated thrust and arranged to direct said taxi thrust in a taxi thrust direction that is substantially the same as said takeoff thrust direction;
said maximum taxi thrust being less than said minimum thrust for efficient operation of a flight engine and providing an initial thrust sufficient to taxi said aircraft along a taxi path.

17. The system of claim 16, wherein said taxi thrust does not exceed 7.5% of said total rated thrust.

18. The system of claim 16, wherein all of said flight engines have, in total, a flight engine weight and said taxi engine is configured with a taxi engine weight that does not exceed 10% of said flight engine weight.

19. The system of claim 18, wherein said taxi engine weight does not exceed 7.0% of said flight engine weight.

20. The system of claim 16, wherein said taxi engine is further configured to provide a taxi thrust between 40% and 100% of said maximum taxi thrust so that said taxi engine efficiency approximates its maximum efficiency.

21. The system of claim 20, wherein: said taxi thrust does not exceed 15% of said total rated thrust; and said taxi engine weight does not exceed 10% of the total flight engine weight of all of said flight engines.

22. The taxi system of claim 16 wherein the taxi engine thrust is less than about 3000 pounds or less than 15% of takeoff thrust.

23. The taxi system of claim 16 wherein each flight engine has a rated thrust of at least about 20,000 pounds and the taxi engine has an initiation thrust of less than about 3000 pounds, said taxi engine operating efficiently with a thrust of down to about 1200 pounds thrust.

* * * * *